United States Patent [19]

Nishii et al.

[11] Patent Number: 6,154,807
[45] Date of Patent: *Nov. 28, 2000

[54] MEMORY SYSTEM PERFORMING FAST ACCESS TO A MEMORY LOCATION BY OMITTING THE TRANSFER OF A REDUNDANT ADDRESS

[75] Inventors: Osamu Nishii, Inagi; Nobuyuki Hayashi, Hadano; Noriharu Hiratsuka, Fujimi; Tetsuhiko Okada, Hachioji; Hiroshi Takeda, Higashiyamato, all of Japan

[73] Assignee: Hitachi, Ltd., Tokyo, Japan

[*] Notice: This patent is subject to a terminal disclaimer.

[21] Appl. No.: 09/188,902

[22] Filed: Nov. 10, 1998

Related U.S. Application Data

[63] Continuation of application No. 08/815,600, Mar. 12, 1997, Pat. No. 5,873,122, which is a continuation of application No. 08/301,887, Sep. 7, 1994, abandoned.

[30] Foreign Application Priority Data

Sep. 8, 1993 [JP] Japan ................................ 5-223079

[51] Int. Cl.[7] .................................................. G06F 12/02
[52] U.S. Cl. .............................. 711/5; 711/105; 711/119; 711/154; 711/155; 365/230.03
[58] Field of Search ............................. 711/5, 105, 154, 711/155, 119; 365/230.03

[56] References Cited

U.S. PATENT DOCUMENTS

| 4,825,358 | 4/1989 | Letwin ........................................ 713/1 |
| 5,187,792 | 2/1993 | Dayan et al. ................................ 713/2 |
| 5,193,161 | 3/1993 | Bealkowski et al. .................... 711/206 |
| 5,329,629 | 7/1994 | Horst et al. ................................. 711/5 |
| 5,430,686 | 7/1995 | Tokami et al. ...................... 365/230.08 |
| 5,491,808 | 2/1996 | Geist Jr. ................................... 711/100 |
| 5,873,122 | 2/1999 | Nishii et al. ................................. 711/5 |

OTHER PUBLICATIONS

"Performance analysis for a cache system with different DRAM" by N. Mekhiel et al, Electrical and Computer Engineering, 1993 Conference IEEE, 1993.

"A 50–ns 16 Mb DRAM with a 10–ns Data Rate and On–chip ECC" by H. Kalter et al IEEE Journal of Solid–State Circuits vol. 25, No. 5 pp. 1113–1128, Oct. 1990.

"Implementation of a sub–10 ns serial access mode to a standard"by Y. Watanabe et al, Custom Integrated Circuits, 1993 Conference IEEE, 1991.

Hitachi IC Memory Data Book 3, Sep. 1992.

"Hot Chips IV", by G. Langdon, Stanford University pp. 4.2.2–4.2.12, Aug. 1992.

HM 5241605 131072–Word X 16–bit X 2–bank Synchronous Dynamic RAM, Hitachi Semiconductor pp. 1–6, 36–39, Feb. 20, 1994.

*Primary Examiner*—Do Hyun Yoo
*Assistant Examiner*—Than Nguyen
*Attorney, Agent, or Firm*—Antonelli, Terry, Stout & Kraus, LLP

[57] ABSTRACT

A data processing system including a processor LSI and a DRAM divided into banks, for increasing a ratio of using a fast operation mode for omitting transfer of a row address to the DRAM and for minimizing the amount of logics external to the processor LSI. The processor LSI includes row address registers for holding recent row addresses corresponding to the banks. The contents of the row address registers are compared with an accessed address by a comparator to check for each bank whether the fast operation mode is possible. As long as the row address does not change in each bank, the fast operation mode can be used, thus making it possible to speed up operations, for example in block copy processing.

4 Claims, 8 Drawing Sheets

MEMORY SYSTEM PERFORMING FAST ACCESS TO A MEMORY LOCATION BY OMITTING THE TRANSFER OF A REDUNDANT ADDRESS

This is a continuation of application Ser. No. 08/815,600, filed Mar. 12, 1997 now U.S. Pat. No. 5,873,122; which is a continuation of Ser. No. 08/301,887, filed Sep. 7, 1994, now abandoned.

BACKGROUND OF THE INVENTION

The present invention generally relates to a data processing system, and more particularly to a circuit for controlling memories in a microprocessor LSI and microprocessor peripheral circuits.

Dynamic memories are generally referred to as DRAM (Dynamic Random Access Memory). Specifications of typical dynamic memory LSI's are described in, for example, "Hitachi IC Memory Data Book 3 (DRAM, DRAM Modules)", pp. 445–464. A dynamic memory described in this document has ten address input terminals indicated by A0–A9 which are shared to receive row and column addresses (see page 448). Also according to this literature, a read/write access requires a row address and a column address to be provided to the dynamic memory LSI in this order (see page 454), wherein read access time is 70 nanoseconds after the establishment of the externally provided address (1 nanosecond=$1 \times 10^{-9}$ second). Alternative to this read/write access, if a fast page mode (page 461) is used, after the first row and column addresses have been transferred, as long as second and subsequent accesses are made to the same row, transfer of the row address can be omitted, with the result that read access time required for the second and subsequent read accesses is reduced to 20 nanoseconds from the establishment of the external address.

An example of a DRAM control function designed for a conventional microprocessor (hereinafter simply called the "processor") is described in "Hot Chips IV", pp. 4.2.2–4.2.12, August. 1992, held in Stanford University. On page 4.2.3 of this document, a drawing is illustrated in which a processor LSI is directly connected to two banks of DRAM chips. Also, timing charts on pages 4.2.7 and 4.2.8 of this document respectively include descriptions "Check fast page cache-hit" and "Check fast page cache-miss", from which it can be predicted that the fast page mode of the dynamic memory is used under certain hit conditions within the processor. This operation would be enabled, for example, by storing a row address with which a dynamic memory has been accessed at the previous time. The above-mentioned document, however, does not at all refer to how to use two-bank DRAM's or the relation between the cache-hit of the high speed mode and the two-bank DRAM's.

Assume now a conventional processor LSI which includes, among its terminals, dynamic memory address terminals which are used for both row and column addresses. FIG. 2 shows an example of accesses performed by this processor. It should be noted that in FIG. 2, the horizontal direction represents the time axis, and reference numeral 201 designates an access request from the processor; 202 dynamic address terminals A0–A9 of the processor; 203 a row address strobe (RAS–n) signal of a dynamic memory; and 204 a column address strobe (CAS–n) signal of the dynamic memory. A suffix "–n" to a signal line indicates that a signal on that line is of negative polarity.

This exemplary access occurs, for example, when a block of data, i.e., the contents of a memory in a certain region is copied to another region of the memory. In FIG. 2, a region from address A000 is copied to a region from address 7040. It should be noted that in this specification memory addresses are indicated in hexadecimal number. An explanatory diagram 205 shows how to use 32 bits of a physical address. Specifically, bits (30–31) of the physical address are assigned to an in-word address; bits (21–29) to a column address of a dynamic memory; and bits (11–20) to a row address of the dynamic memory. Here, bit (i) indicates the position of the i-th bit from the leftmost bit which is designated as bit 0 position. The copy is carried out by the following time-sequential operations.

Operation 1: The contents at address A000 are read. A row address and column address are transferred to the dynamic memory. The row address given by the bit positions (11–20) of the physical address is "14", then the column address given by the bit positions (21–29) is zero.

Operation 2: The contents of address A004 are read. Since the row address at this time is the same as that at the previous time, transfer of the row address to the dynamic memory is omitted. Thus, the column address only is transferred to the dynamic memory.

Operation 3: The contents of address A000 are written into address 7040. A row address and column address for this location are transferred to the dynamic memory.

Operation 4: The contents of address A004 are written into address 7044. Since the row address at this time is the same as that at the previous time, the transfer of the row address to the dynamic memory is omitted. Thus, the column address only is transferred to the dynamic memory.

Since the subsequent four accesses perform similar operations to the above, explanation thereon will be omitted.

As shown by the example of FIG. 2, the prior art example has a problem that if a row address of a memory location (source) from which data is read and a row address of a memory location (destination) to which the data is written are different in the block copy processing, the fast mode for omitting the transfer of a row address of the dynamic memory is prohibited each time the access source and destination are switched.

SUMMARY OF THE INVENTION

It is an object of the present invention to solve the problem of the fast mode for omitting the transfer of a row address of a dynamic memory, which is prohibited depending on conditions.

It is another object of the present invention to provide a signal line interface for a processor LSI which allows the fast mode for omitting the transfer of a row address of a dynamic memory to be used in a processor which does not have address terminals for both row and column addresses, and which thereby simultaneously minimizes the amount of logic mounted external to the processor LSI.

It is another object of the present invention to provide a signal line interface for a processor LSI which allows information on a fast page operation mode corresponding to plural banks of synchronous dynamic memories to be set from the processor LSI, and which minimizes the amount of logic mounted external to the processor LSI.

According to one feature of the present invention, there is provided a data processing system comprising: a data processing unit; a memory; a plurality of address registers for holding recently accessed addresses; selector means for selecting one of the plurality of address registers by using particular bit information in a currently accessed address;

comparator means for comparing, when the data processing unit issues a bus access to the outside, an access address for the bus access with the contents of the address register selected by the selector means in accordance with the particular bit information; and control means for performing an operation for omitting transfer of the access address to the memory when the result of a comparison made by the comparator means shows coincidence.

A concept of the above-mentioned feature will be explained below with reference to FIG. 1, an internal configuration of a processor which employs the present invention (the configuration in FIG. 1 will be further explained in detail hereinunder; In the present invention, a processor LSI 100 includes a plurality of row address registers (storage units) 101, 102. One or a plurality of particular bits are specified within a plurality of address bits. The specified bits are hereinafter referred to as "DRAM bank bits". The plurality of row address registers 101, 102 hold row addresses of the respective banks which have been accessed at the previous time.

The dynamic memory is divided into a plurality of banks such that one bank in the dynamic memory specified by the bank bit is accessed at one time.

When the processor LSI issues a bus access to the outside, a coincidence comparator 107 compares an output value 101 of the row address register 101 or 102 selected by the bank bit of an access address with a row address portion of the access address. If the result 113 of comparison is true, the processor LSI performs an operation for omitting transfer of the row address to the dynamic memory LSI.

FIG. 3 shows an access pattern of an information processing system employing the present invention. Components 301, 114, 117, 116, 305 in FIG. 3 correspond to components 201–205 in FIG. 2, respectively, so that explanation thereon will be omitted. As shown in 205, a 32-bit physical address of this example consists of the less significant two bits of bit positions 30–31 assigned to an in-word address; bits of bit positions 21–29 to a column address; bit (20) to a bank address of a dynamic memory; and bits of bit positions 9–19 to a row address of the dynamic memory. In one access, a dynamic memory LSI specified by the bank bit of bit position 20 only is accessed.

In one access, one bank in a dynamic memory specified by the bank bit only is accessed. During a period for accesses to addresses A000, A004, a dynamic memory LSI corresponding to bank 0 is accessed. On the other hand, during a period for access to addresses 7040, 7044, a dynamic memory LSI corresponding to bank 1 is accessed, but the dynamic memory LSI corresponding to bank 0 is not accessed. Subsequently, when address A008 is to be read, the row address at this time is the same as the row address when the dynamic memory LSI corresponding to bank 0 was accessed at the previous time, so that transfer of the row address may be omitted. During this period, the dynamic memory LSI corresponding to bank 1 is not accessed. Subsequently, when data is written into address 7048, the row address is the same as that when the dynamic memory LSI corresponding to the bank 1 was accessed at the previous time, so that transfer of the row address may be omitted.

Comparing FIG. 3 with FIG. 2, it is understood that transfer of the row address may be omitted when the addresses A008, 7048 are accessed. Since access time required in this event is shorter as mentioned above, the omission of the transfer of the row address contributes to a higher processing speed.

When the foregoing block copy processing further continues, the fast page mode may be used to omit the transfer of the row address as long as the same rows are continuously accessed in both source and destination.

Other objects, configurations and effects of the present invention will become apparent from the following description of preferred embodiments taken in conjunction with the accompanying drawings.

DESCRIPTION OF THE PREFERRED EMBODIMENTS

Figure 1:
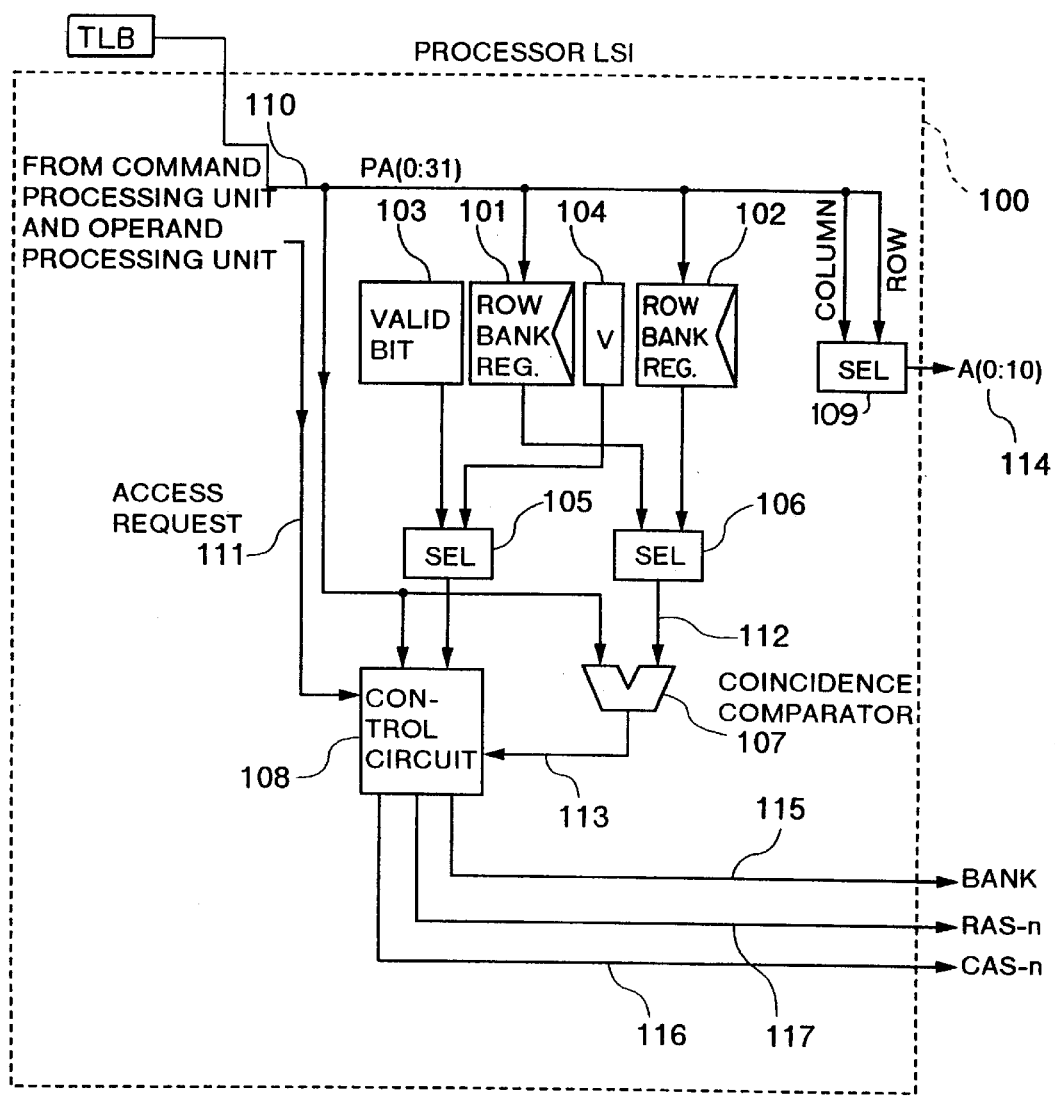
FIG. 1 is a block diagram showing the configuration of a processor LSI in an information processing system which employs the present invention.
Figure 2:
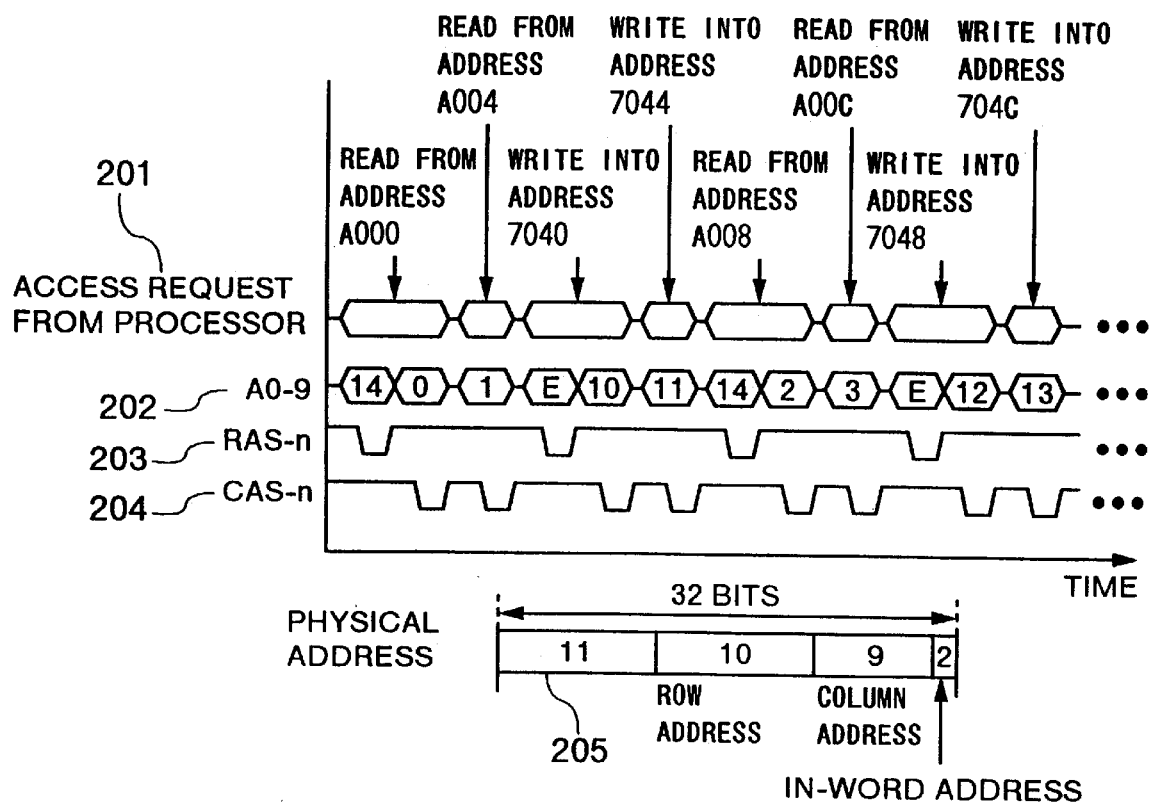
FIG. 2 shows an access pattern (changes in operation with the lapse of time) in a prior art information processing system.

FIG. 1 shows an example of a processor, generally indicated by 100, for use in an information processing system according to an embodiment of the present invention. The processor 100 includes row address registers (register=storage unit) 101, 102; bits 103, 104 which indicate the validity of the row address registers 101, 102, respectively; and selector circuits 105, 106. The selector 105 selects one of outputs of the valid bits 103, 104 in accordance with a bank address, and delivers the selected one onto a signal line 112. Reference numeral 107 designates a coincidence comparator for comparing a row address in a access requested address 110 with a row address stored in one of the row address registers 101, 102 selected by the selector circuit 106; 108 a control circuit; and 109 a selector circuit.

The processor 100, when accessing to an external dynamic memory, selects either a row address portion or a column address portion in the access requested address 110 by using the selector circuit 109 and outputs the selected address portion to an address terminal 114 having bits A(0:10) for dynamic memories. The control circuit 108 is applied with the output of a valid bit selected by the selector circuit 105 and with an output signal 113 of the coincidence comparator 107 indicative of the result of comparison between a row address in the access requested address 110 and a row address stored in one of the row address registers 101, 102 selected by the selector circuit 106. The control circuit 108 is also applied with a part of an address bus 110 corresponding to the bank bit. Then, the control circuit 108 outputs signal values of three external terminals BANK (115), RAS–n (117) ("–n" indicates a negative polarity signal), and CAS–n (118).

Figure 3:
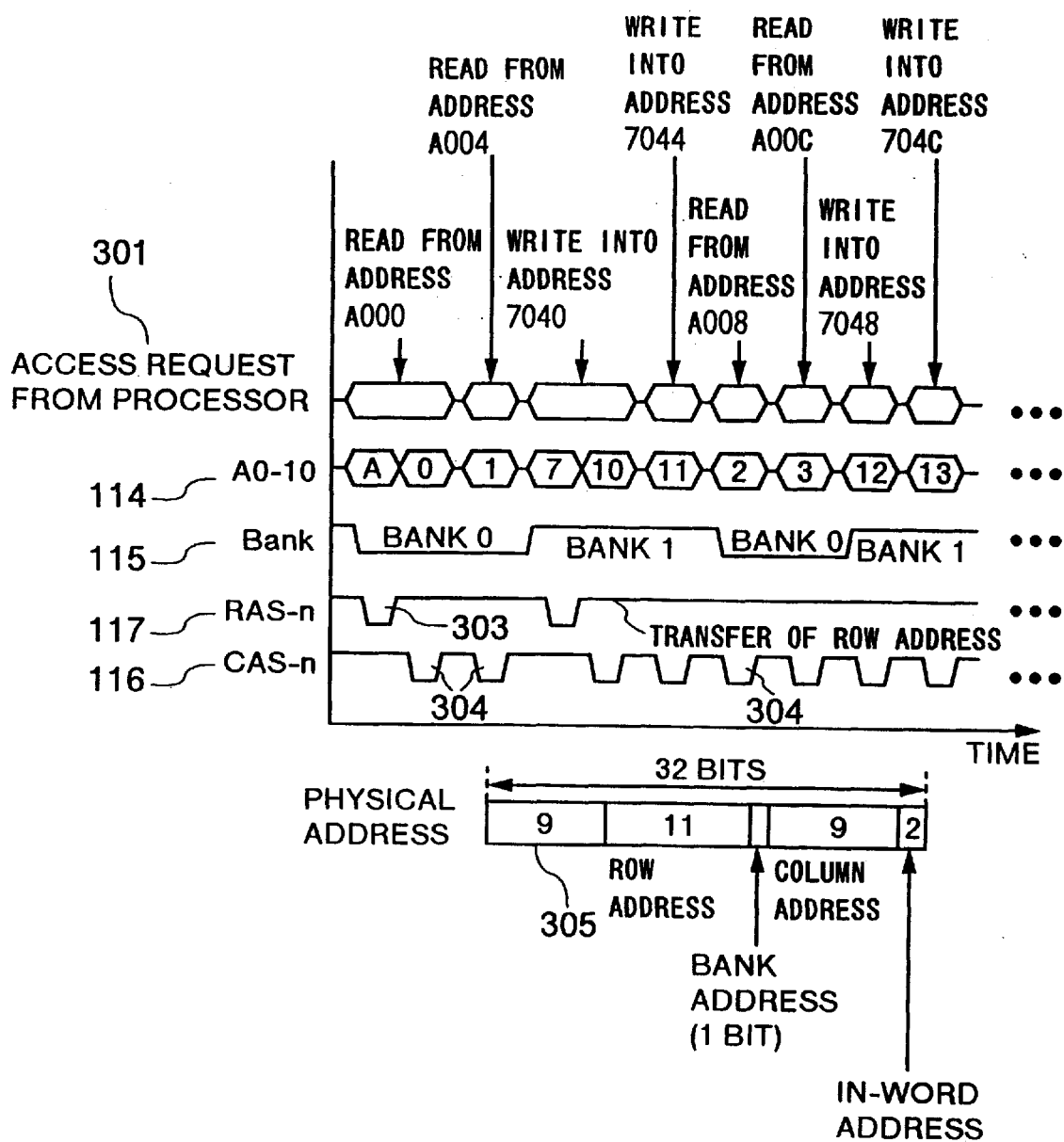
FIG. 3 shows an access pattern (changes in operation with the lapse of time) in the information processing system employing the present invention.

A 32-bit physical address, as illustrated in FIG. 3, includes fields respectively assigned to a row address, a column address, and a bank address.

A flow of processing executed by the processor 100 when generating an access request proceeds as follows.

First, an access request signal generated from a data processing unit (not described or shown since this is not so deeply related to the present invention) composed of a command processing unit and an operand processing unit, arranged inside the processor 100, is transferred to the control circuit 108 through a signal line 111. Simultaneously, an access requested address 110 is transferred through the address bus PA (0–31). The control circuit 108 selects one of the row address registers 101, 102 by the selector circuit 106 in accordance with a bank address (bit 20) in the access requested address. The control circuit 108 also selects one of the valid bits 103, 104 by the selector circuit 105 in accordance with the bank address. When the row address selected by the selector circuit 106 is equal to a row address portion of the access requested address to cause the associated valid bit to be set to "1", this is referred to as "hit".

If a hit occurs, the dynamic memory will be accessed with the same row address as that in the previous access, so that the access at the present time will be performed in an operation mode for omitting transfer of the row address to the dynamic memory.

If a miss occurs, the dynamic memory is first accessed in an operation mode for transferring both the row and column address portions of an access requested address of the dynamic memory. Next, the row address portion is registered in one of the row address registers 101, 102 selected by the bank address, and the valid bit 103 or 104 associated with the selected row address register is written to "1". It should be noted that the valid bits 103, 104 are set to "0" in an initial state immediately after power-on in order to prevent an erroneous hit from occurring when the row addresses accidentally match with each other in the first access after power-on.

Figure 4:
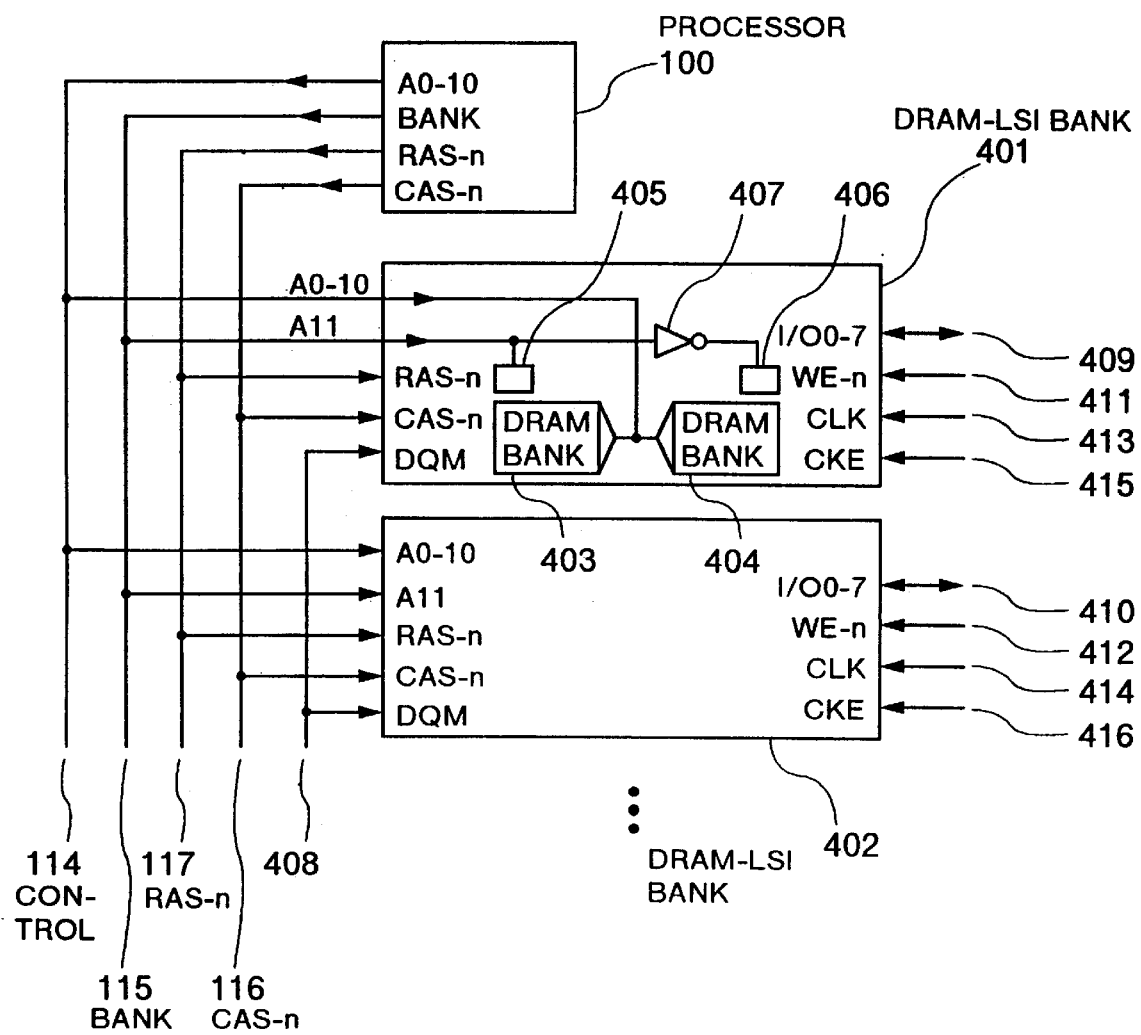
FIG. 4 is a block diagram showing the configuration of a system which includes a synchronous dynamic memory divided into two banks.

FIG. 4 shows a block diagram of a system including the processor 100. The system also has synchronous dynamic memory LSI's 401, 402. The control signals A(0:10) (114), Bank (115), RAS–n (117), CAS–n (116) are connected to the memory LSI's 401, 402. The synchronous dynamic memory LSI 401 is divided into two banks 403, 404 such that the memory bank 404 is accessed when the control signal BANK (115) is at "0", and the memory bank 403 is accessed when BANK (115) is at "1". As is well known, logic "0" on a signal line means "LOW" potential, and logic "1" means "HIGH" potential.

When the signal BANK (115) is at "0", logic "1" is generated at the output of an invertor 407 and is transferred to a bank 0 memory control circuit 406. This is an indication of an access to the bank 0 memory. Conversely, when the signal BANK (115) is at "1", logic "0" is transferred to the bank 0 memory control circuit 405. This is an indication of an access to a bank 1 memory.

In addition, each of the dynamic memory LSI's 401, 402 has the following terminals: I/O0–7 (409, 410) representing an 8-bit data input/output signal; WE–n (411, 412) representing a write command signal which remains at logic "0" during a write operation; CLK (413, 414) representing a clock input terminal; CKE (415, 416) representing a clock enable signal for controlling whether or not a clock is transferred to the inside; and DQM (408) representing an access mask signal which functions as an output enable signal in a read access for outputting the data input/output signal I/O0–7, and as a write enable signal in a write access for enabling the data input/output signal I/O0–7 to be written each time the clock is applied thereto.

The dynamic memory LSI's 401, 402 have several forms of operation mode information for their synchronous operation which are RAS delay (the number of clock cycles from RAS to a data access), CAS delay (the number of clock cycles from CAS to a data access), and burst length (a period in which the address is counted up from initial value to an end value and returned to the initial value). These mode information signals are written through the address bits A0–10 when all of RAS–n (116), CAS–n (116), and WE–n (411) are at potential "L".

Figure 5:
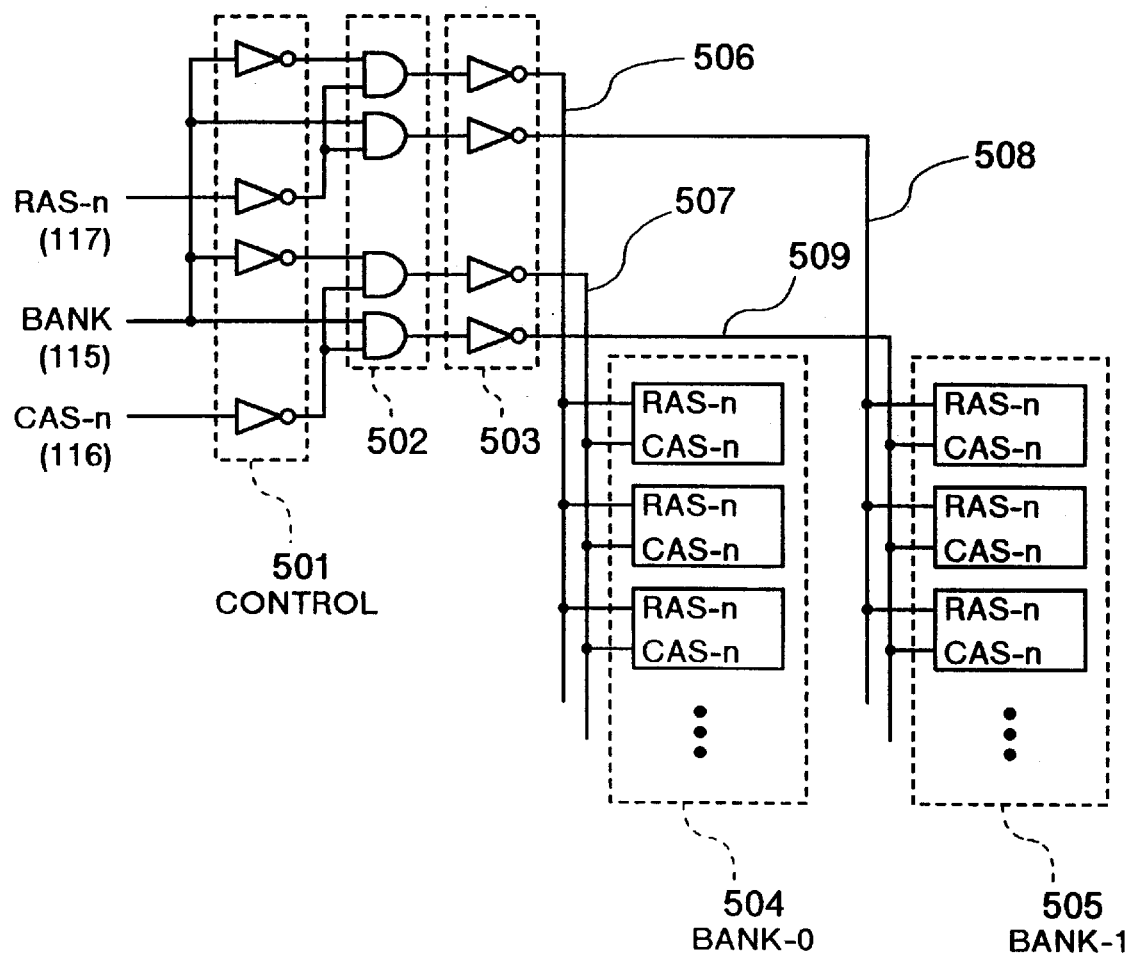
FIG. 5 is a block diagram showing dynamic memory banks and its control circuit in the information processing system employing the present invention.

FIG. 5 shows dynamic memories and its control circuit in another system including the processor 100. Blocks 501, 503 each include a plurality of invertors. Another block 502 includes a plurality of two-input AND circuits, each of which generates an output value "1" only when both input values are "1". A block 504 includes dynamic memories of bank 0, and a block 505 includes dynamic memories of bank 1. Lines 506, 507 respectively carry a negative-polarity row address strobe signal and column address strobe signal for the dynamic memories 504 of bank 0. Lines 508, 509 respectively carry a negative-polarity row address strobe signal and column address strobe signal for the dynamic memories 505 of bank 1.

When the signal BANK (115) is at "0", negative pulses appearing on RAS–n (117), CAS–n (116) (see 303, 304 in FIG. 3) are transferred to the signal lines 506, 507, respectively, but not to the signal lines 508, 509. As a result, a dynamic memory 504 in bank 0 is accessed. Conversely, when the signal BANK (115) is at "1", the negative pulses appearing on RAS–n (117), CAS–n (116) are transferred to the signal lines 508, 509, respectively, but not to the signal lines 506, 507. As a result, a dynamic memory 505 in bank 1 is accessed.

Figure 6:
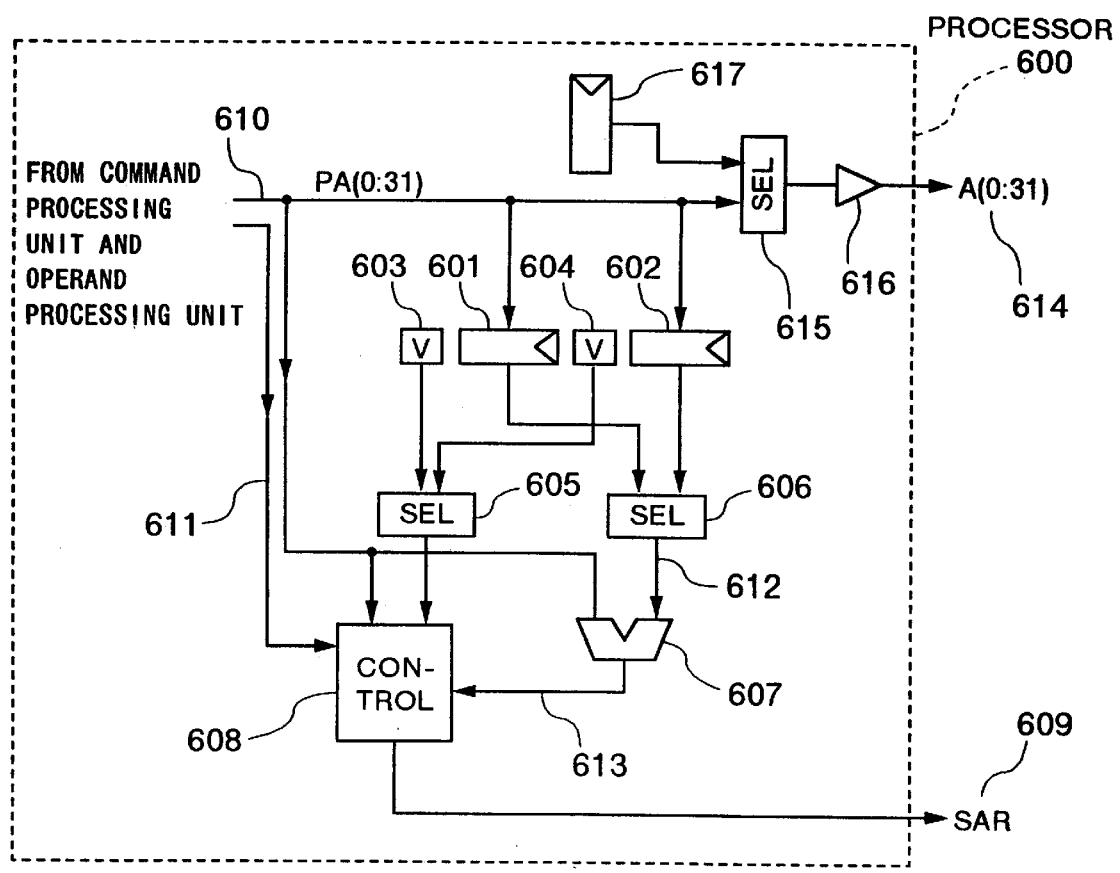
FIG. 6 is a block diagram showing the configuration of a processor LSI in another information processing system employing the present invention.

FIG. 6 shows an example of another processor, generally indicated by 600, which employs the present invention. Since components 601–608 and signal lines 610, 611–613 are arranged similarly to their correspondents 101–108, 110, 111–113 in FIG. 1, explanation thereon will be omitted. The processor 600 does not have a shared address terminal through which row and column addresses are specified, but a 32-bit address terminal A(0–31) (614) including a separate row address and column address.

A two-input selector 615 selects one of an access requested address 610 and an address stored in a register 617, and delivers the selected one to the address terminal A(0:31) (614). An output buffer 616 for the processor 600 is arranged at the output of the selector 615, and delivers an output with a logic value identical to that of an input.

When the two-input selector 615 selects the access requested address 610, the resulting operation is similar to that explained in connection with FIG. 1. This operation to be executed when the access requested address 610 is selected will be explained below.

When the processor 600 generates an access request, the following processing flow is executed. First, an access request signal from a processing unit including a command processing unit and an operand processing unit arranged within the processor 600 is transferred to a control circuit 608 through a signal line 611. Simultaneously, an access address is transferred through an address bus PA(0:31) (610). The control circuit 608 selects one of outputs from row address registers 601, 602 in accordance with a bank address in the access requested address. Also, a selector 605 selects one of valid bits 603, 604 in accordance with the bank address.

If a hit occurs, the control circuit 608 sets an output terminal SAR (609) to "1". The terminal SAR delivers an output signal which indicates an access to the same row region. The definition of "hit" is the same as that made in connection with the explanation of FIG. 1.

If a miss occurs, the control circuit 608 sets SAR to "0". Also, information is registered in the registers 601, 602 and valid bits 603, 604 as is done in the example of the processor 100.

A circuit external to the processor LSI 600 detects that SAR (609) is at "1" to know that a fast operation mode may be used for omitting transfer of a row address of an associated dynamic memory.

Figure 7:
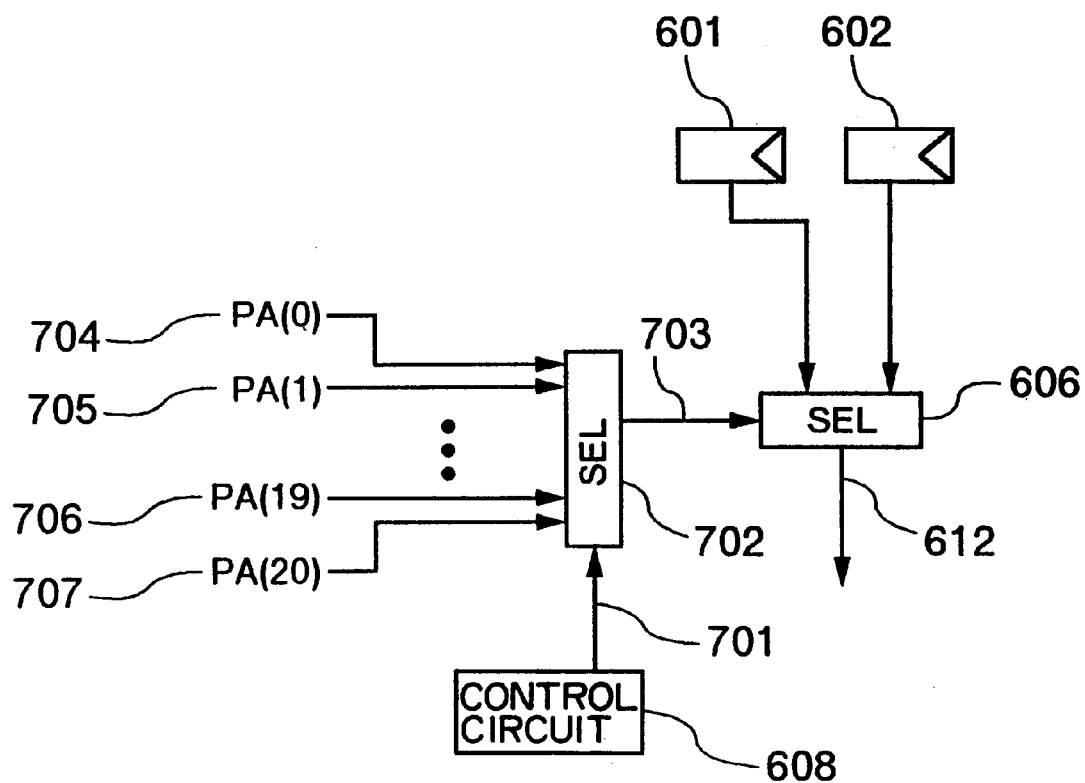
FIG. 7 shows a bank selector circuit and a bank bit selector circuit associated with the processor shown in FIG. 6.

The processor LSI 600, unlike the processor LSI 100, does not have bank bits fixed at predetermined positions. FIG. 7 shows part of the configuration related to a bank bit selecting method. Since components 601, 602, 606, 608, 612 in FIG. 7 have already been explained, repetitive explanation thereon will be omitted. A two-input selector 606 in FIG. 7 is controlled by a bank bit control signal 703. A 21-input selector 702 selects one from input signals 704, 705, . . . , 706, 707 in accordance with a control signal 701 from the control circuit 608, and delivers the selected signal onto a signal line 703. Input signals 704, 705, 706, 707 are individual address signals included in a requested address on the address bus PA(0:31) (610). The processor 600 can arbitrarily set the control signal 701 by using a particular command. In summary, an arbitrary bit within bit positions 0–20 in a requested address can be used as a bank address.

Next, explanation will be given of how the two-input selector 615 in FIG. 6 selects the register 617. Set in the register 617 is information on an operation mode (RAS delay, CAS delay, burst length) of a synchronous dynamic memory. By the processor 600 executing the particular command, the two-input selector 615 selects the register 617 and outputs information registered therein onto the address terminal A(0:31) (614). An operation mode setting operation is achieved for the synchronous dynamic memory connected external to the processor 600 by a combination of appropriate external circuits.

Figure 8:
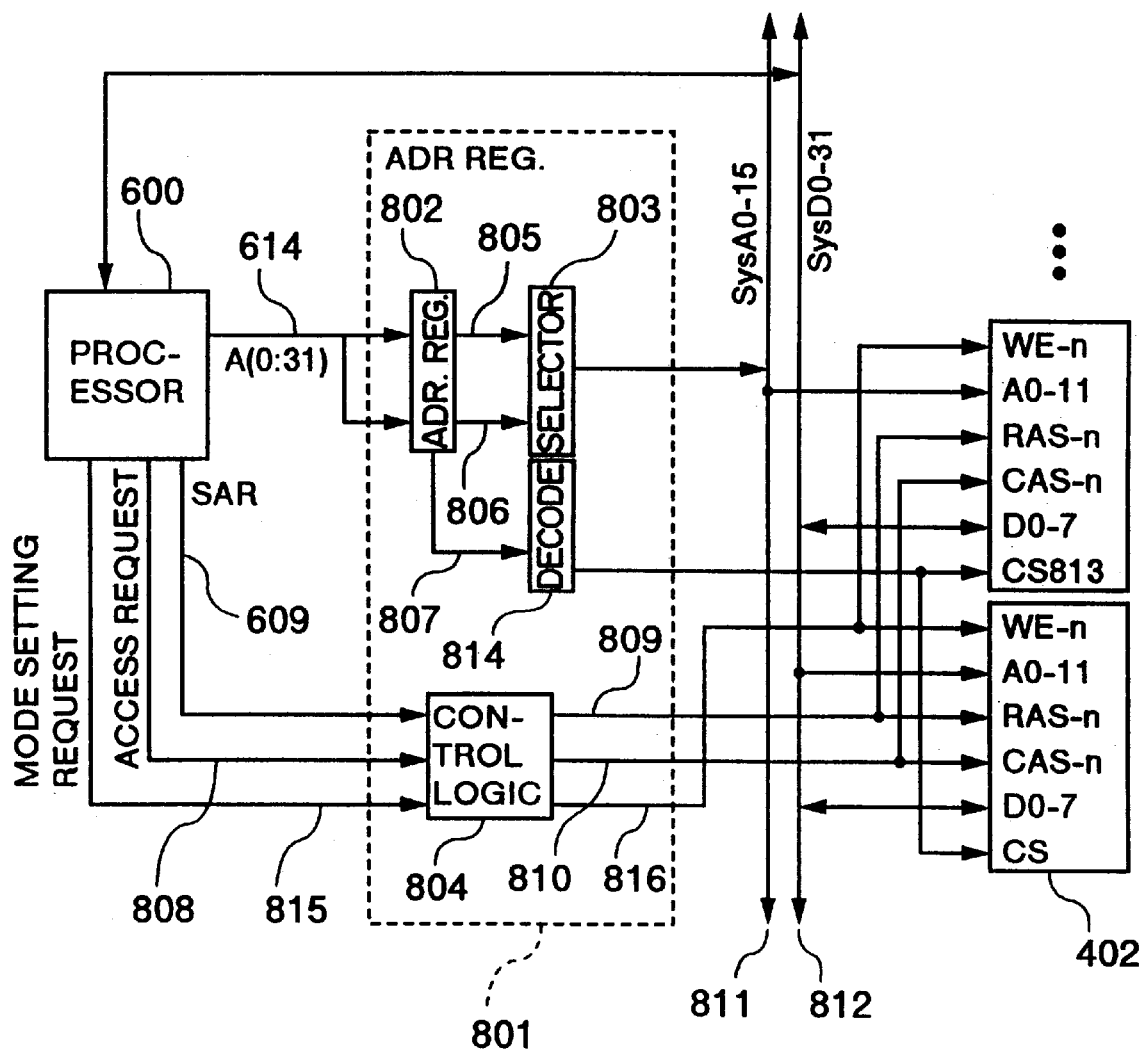
FIG. 8 is a block diagram showing the configuration of an information processing system employing the processor illustrated in FIG. 6.

FIG. 8 shows the configuration of an exemplary information processing system which employs the processor LSI 600. The configuration in FIG. 8 is mainly composed of the processor LSI 600, an external circuit control LSI 801, and main memory LSI's 402 using synchronous dynamic memories.

Explanation will first given of how an address signal 614 is transferred from the processor LSI 600. The address signal 614 is applied to the external circuit control LSI 801 and stored in an address register 802 provided therein. Signal lines 805, 806 from the address register 802 carry a row address and a column address to the main memory LSI's 402, respectively. Either of the row address 805 and the column address 806 is selected by a two-input selector 803 and sent to a system address bus 811. The address signal on the system address bus 811 is further transferred to an address terminal of the respective main memory LSI's 402.

Within an address registered in the address register 802, upper address bits 807 are decoded by an address decoder 814, and the decoded result is transferred to a chip select terminal 813 of the respective main memory LSI's 402.

A 32-bit system data bus 812 is used to communicate data between the processor LSI 600 and the main memory LSI's 402. It should be noted that since the memory LSI 402 has a data terminal of eight bit width, the system of this embodiment should include at least four memory LSI's 402 for communicating 32-bit data.

The external circuit control LSI 801 includes an access request managing logic 804 for managing conditions related to the access. From the processor LSI 600, an access request signal 808, an identical address indicating signal 609, and operation mode setting request signal 815 for dynamic memories are transferred to the access request managing logic 804.

When the signal 815 is at logic "0", the access request managing logic 804 operates as follows. First, when an access request exists in the signal 808 and the identical address indicating signal is at logic "0", RAS–n (809) is issued to the main memory LSI's 402, and simultaneously a row address 805 is delivered onto the system address bus 811. Subsequently, CAS–n (810) is issued to the main memory LSI's 402, and simultaneously a column address 805 is delivered onto the system address bus 811.

Second, when an access request exists in the signal 808 and the identical address indicating signal is at logic "1", issue of the RAS–n (809) and row address 805 is omitted, unlike the first case.

When the processor 600 executes the aforementioned particular command (the command mentioned when the register 617 was explained), the operation mode setting request signal 815 changes to logic "1". When the signal 815 is at logic "0", the access request managing logic 804 sets all of RAS–n (809), CAS–n (810), and WE–n (816) to potential "L". Simultaneously with this, the value stored in the operation mode register 617 is transferred to the main memory LSI's 402 through the system address bus 811. In this manner, the operation mode setting processing is carried out for the main memory LSI's 402. This processing is performed during an initial operation after the power is turned on, or when the system is reset. Since the processor LSI 600 provides the operation mode setting request signal 815, logics so far required for producing a signal used to generate an operation mode setting processing starting signal for the main memory LSI's 402, for example, an address decoding logic, are made unnecessary.

The system of the present invention is implemented in HITACHI HM 5241605 series, 131072-word×16-bit×2-bank Synchronous Dynamic RAM which is incorporated herein by reference.

It will be understood that the present invention is not limited to the above described specific embodiments, but may be modified in various manner within the scope of its technical ideas. For example, while the number of row address registers and the number of banks in a dynamic memory are set to two, these numbers may be increased to four, eight, and so forth. Also, the row address registers and coincidence comparator are not necessarily arranged in the processor LSI, and in alternative, processing similar to that of the above embodiments may be performed external to the processor LSI, for example, in the external circuit control LSI 801.

According to the embodiments of the present invention, row addresses of source and destination are held in row address registers for processing such as a block copy, so that a fast operation mode for dynamic memories can be used to omit transfer of the row address.

Also, since the row address hit information 690 is provided as an output signal of the processor LSI 600, the embodiments of the present invention allow processors, which do not have a shared address terminal for both row and column addresses of a dynamic memory, to use the fast operation mode for dynamic memories, whereby the amount of logics external to the processor LSI is minimized, and transfer of a row address to the dynamic memories is omitted.

Further, according to the embodiments of the present invention, since the processor LSI 600 provides the operation mode setting request signal 815, logics so far required for producing a signal used to generate an operation mode setting processing starting signal for the main memory LSI's 402, for example, an address decoding logic and so on, are made unnecessary.

What is claimed is:

1. A data processing system, comprising:

a data processing unit;

a memory which is divided into a plurality of banks such that an access is made to one of said banks at a time;

a plurality of address registers coupled to said data processing unit, and corresponding to said plurality of banks;

a comparator coupled to at least one of outputs from said address registers; and a controller coupled to said comparator, wherein said data processing unit accesses one of said banks for reading out data, and accesses another bank of said banks for writing data, wherein each of said plurality of address registers holds recently accessed addresses corresponding to said plurality of banks, wherein said comparator compares an access address for a bus access with contents of at least one of said address registers, when said data processing unit issues said bus access, and wherein said controller omits transfer of said access address to said memory in response to an indication of a coincidence by said comparator, when said bus access is a next bus access after a bus access to a different bank, said indication indicating a coincidence between said access address and said contents of said at least one of said address system.

2. A data processing system according to claim 1, wherein said data processing unit, and said plurality of address registers are integrated in a single processor LSI.

3. A data processing system according to claim 1, wherein said access address is a row address.

4. A data processing system according to claim 1, wherein said memory is a dynamic memory LSI.

* * * * *